United States Patent [19]
Yang

[11] Patent Number: 5,179,252
[45] Date of Patent: Jan. 12, 1993

[54] STRUCTURE OF FLOOR JUNCTION BOX

[76] Inventor: Chin-Hui Yang, 4F., No. 2, Lane 409, Chung Cheng Rd., Hsin Tien City, Taipei Hsien, Taiwan

[21] Appl. No.: 642,936

[22] Filed: Jan. 18, 1991

[51] Int. Cl.⁵ .............................................. H02G 3/12
[52] U.S. Cl. ..................................................... 174/48
[58] Field of Search ........................ 174/48, 49; 52/221

[56] References Cited
U.S. PATENT DOCUMENTS

| | | | |
|---|---|---|---|
| 4,499,332 | 2/1985 | Shea et al. | 174/48 |
| 4,656,798 | 4/1987 | Hazen | 52/221 |
| 4,800,237 | 1/1989 | Mohr | 174/48 |
| 4,984,982 | 1/1991 | Brownlie | 174/48 X |

Primary Examiner—Leo P. Picard
Assistant Examiner—David Tone
Attorney, Agent, or Firm—Varndell Legal Group

[57] ABSTRACT

A junction box which includes a case having fastened therein a plug socket mounting plate with a plurality of plug sockets respectively mounted thereon at three locations; a raised, frame-shaped block at the inside for mounting a rubber packing and a frame-shaped bevel flange; a cover plate pivoted to the frame-shaped bevel flange at the inside. The cover has a hand-hold portion at the top and defining therein a hole through which electric wires can be inserted to respectively connect to the plug sockets by an electric plug. A frame-shaped top insert may be attached to the casing and squeezed in between the rubber packing and the bevel flange, permitting the bevel flange to fit flush with a surrounding surface.

2 Claims, 3 Drawing Sheets

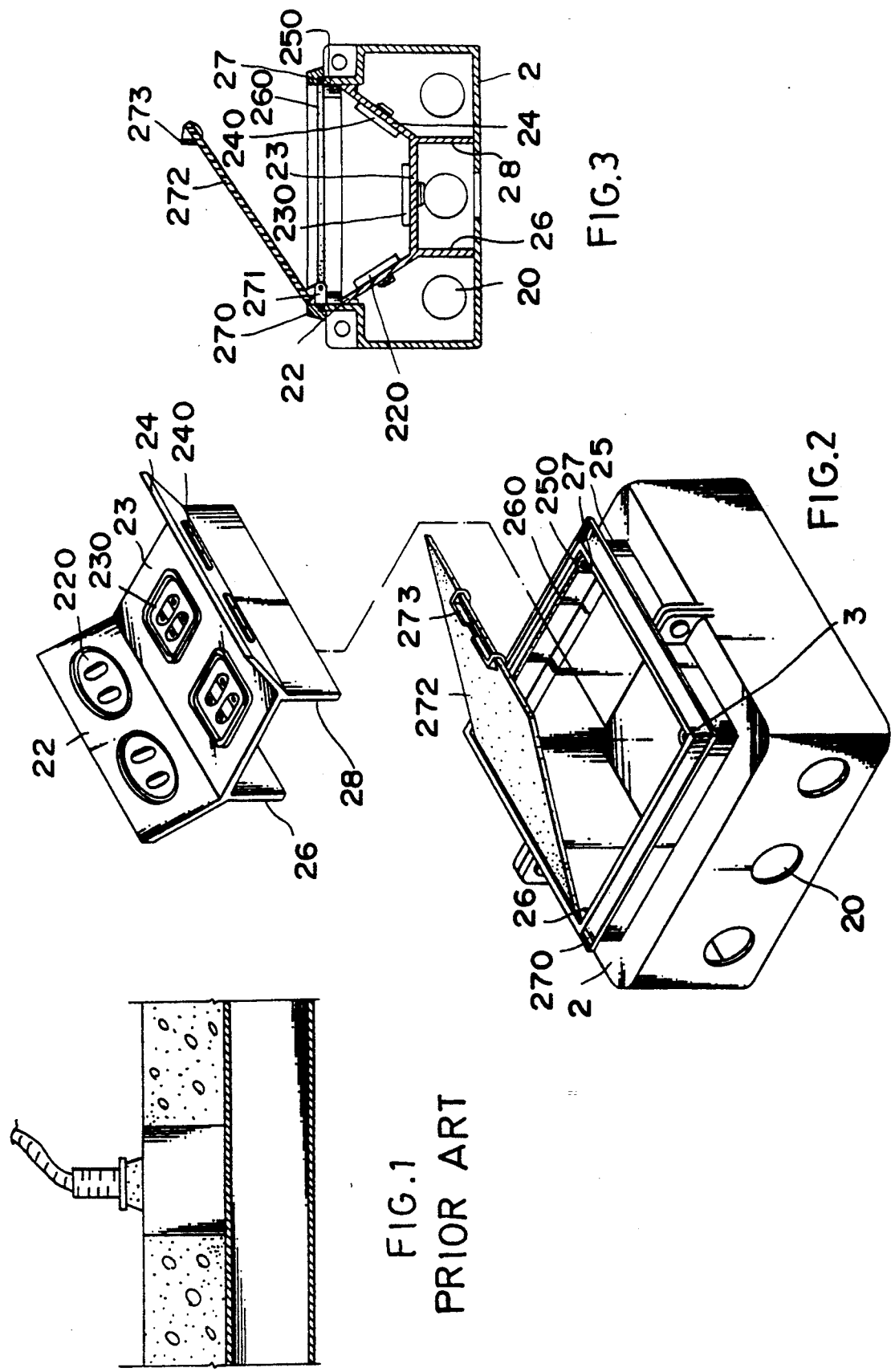

STRUCTURE OF FLOOR JUNCTION BOX

BACKGROUND OF THE INVENTION

The present invention relates to junction boxes, and more particularly to a floor junction box for electric wiring under the ground which has a frame at the top that can be conveniently adjusted to fit flush with a surrounding surface.

A conventional floor junction box, as shown in FIG. 1, generally utilizes a removable cover plate to cover the plug socket thereof when it is not in use. The cover plate can be conveniently removed from the junction box so that electric cable can be connected to the plug socket therein by a plug. Because the plug which is connected to the plug socket is exposed out of the housing of the junction box, it may be easily kicked out of position by the foot. Further, water may easily permeate into the floor junction box when the plug is connected to the plug socket, causing a short circuit or other problems.

SUMMARY OF THE INVENTION

The present invention has been designed to eliminate the aforesaid problems. It is therefore an object of the present invention to provide a junction box which provides a plurality of plug sockets on a novel plug socket mounting frame for connection thereto of a plurality of appliance plugs in good order.

Another object of the present invention is to provide a junction box which can be conveniently adjusted to fit flush with a surrounding surface.

Still another object of the present invention is to provide a junction box which is safe in use and can effectively protect against permeation of water.

Still another object of the present invention is to provide a junction box which is compact, inexpensive to manufacture and easy to install.

A yet further object of the present invention is to provide a junction box which is practical in use and can be conveniently installed in different floor structures.

BRIEF DESCRIPTION OF THE DRAWINGS

FIG. 1 illustrates an installation of a junction box according to the prior art;

FIG. 2 is a perspective exploded view of the preferred embodiment of the present invention;

FIG. 3 is a sectional elevational view of the assembled preferred embodiment of the present invention;

DETAILED DESCRIPTION OF THE PREFERRED EMBODIMENT

Figure 5:
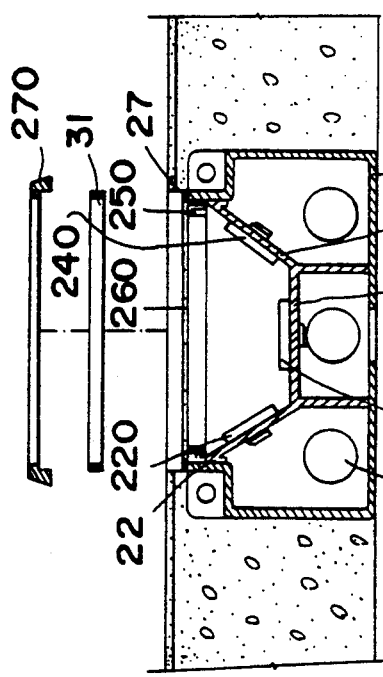
FIG. 5 illustrates a process of installing the preferred embodiment of the present invention in the ground.

Referring to FIGS. 2 and 3, a junction box in accordance with the present invention is generally comprised of a rectangular casing 2 having holes 20 for insertion therethrough of electric wires. A unitary, plug socket mounting plate is fastened inside the casing 2 and has a flat surface portion 23 at the top with two bevel surface portions 22 and 24 extending upwardly therefrom and away from one another wherein the flat surface portion 23 and the bevel surface portions 22 and 24 each have a plurality of plug sockets 220, 230 or 240 mounted thereon for connection to electric plugs. The plug socket mounting plate also includes a pair of depending substantially parallel flange portions 26 and 28 extending downwardly therefrom. A rectangular, frame-shaped block 25 is upstanding from the casing 2 at the top, having four bolt holes 250 internally disposed at the four corners thereof for mounting a rubber packing 260 and a bevel flange 270. The rubber packing 260 and the bevel flange 270 have each four loops 26 or 27 respectively aligned with the bolt holes 250 and secured thereto by screws 3. Further, there is a cover plate 272 pivotably connected to the bevel flange 270 at the inside by means of a pair of hinges 271. When the cover plate 272 is closed, it is smoothly tightly covered over the rubber packing 260 within the bevel flange 270. The cover plate 272 has a unitary hand-hold portion 273 at the top edge thereof opposite to the hinges 271, which hand-hold portion 273 defines therein a hole through which an electric plug can be inserted to connect to either of the plug sockets 220, 230 or 240.

Figure 4:
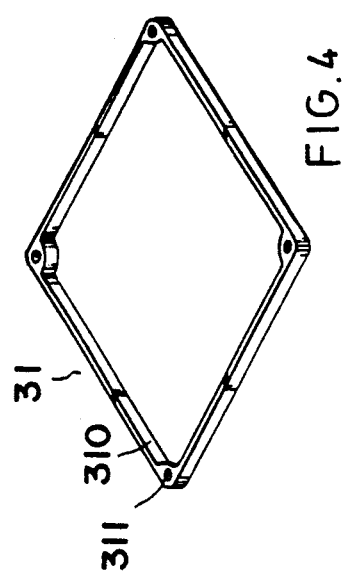
FIG. 4 illustrates a frame-shaped top insert according to the present invention.
Figure 6:
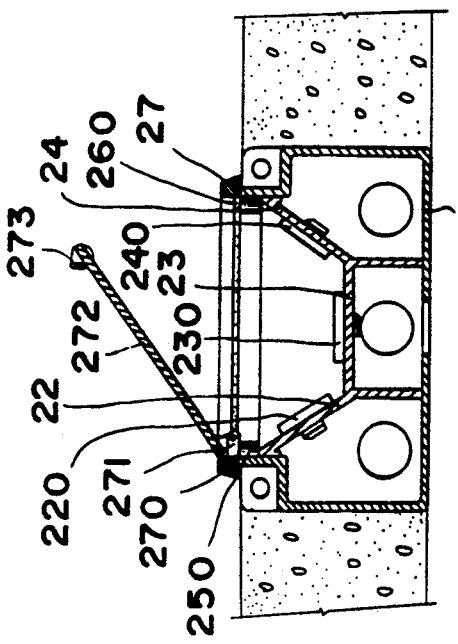
FIG. 6 is a sectional elevational view of the present invention after installation in the ground.
Figure 9:
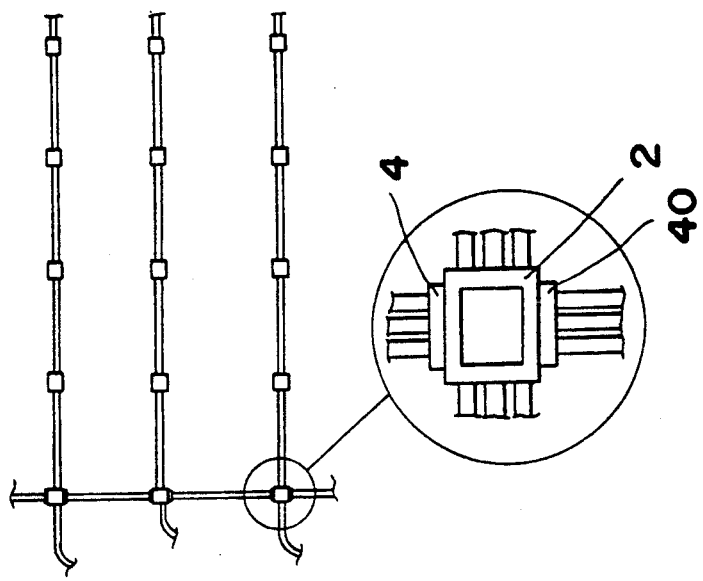
FIG. 9 illustrates an electric wiring installation, in which each junction box is connected with adapters at two opposite ends for connecting electric wires.

Referring to FIGS. 4, 5 and 6, if the topmost edge of the plug socket mounting plate can not fit flush with the surrounding surface (due to the arrangement of a carpet on the surrounding surface) after the junction box is fastened inside the floor, a frame-shaped top insert 31 may be attached to the casing 2 and squeezed in between the rubber packing 260 and the bevel flange 270, permitting the bevel flange 270 to fit flush with the surrounding surface. According to the present invention, a frame-shaped top insert 31 has a rectangular body 310 with four round holes 311 at the four corners thereof. After the screws 3 are removed from the bolt holes 250 and the bevel flange 270 is removed from the rectangular, frame-shaped block 25 of the casing 2, the frame-shaped top insert 31 is mounted on top of the rubber packing 260, and then the bevel flange 270 is mounted on the top of the frame-shaped top insert 31, permitting the loops 26 and 27 and the round holes 311 to be respectively aligned with the bolt holes 250 so that the screws 3 can be respectively fastened therein to secure the rubber packing 260, the frame-shaped top insert 31 and the bevel flange 270 to the frame-shaped block 25 of the casing 2.

Figure 7:
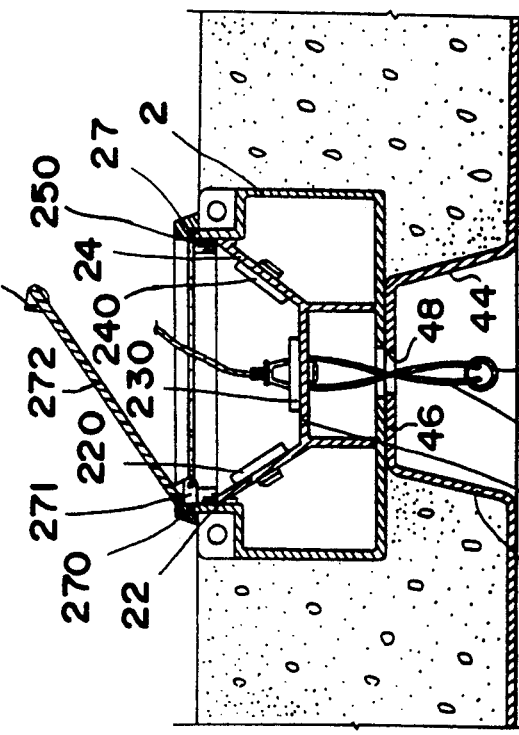
FIG. 7 illustrates the use of the present invention with an electric plug.

Referring to FIG. 7, the junction box of the present invention may be directly mounted on a steel frame 32 permitting the conductors 330, which come from a conduit 33, to be directly inserted through the casing 2 and connected to either one of plug sockets 230 of the flat surface portion 23. Frame 32 includes a central raised portion including sloping side walls 42 and 44 joining a top wall 46 having a hole 48 formed therethrough.

Figure 8:
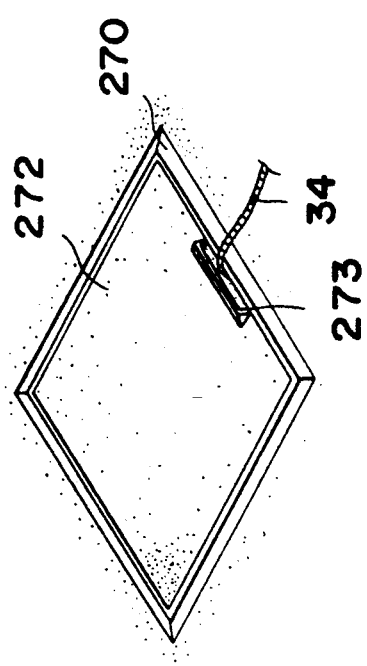
FIG. 8 illustrates that the top edge of the junction box of the present invention fits flush with a surrounding surface.

Referring to FIG. 8, a conductor 34 is inserted through the hole defined in hand-hold portion 273 for connection to either one of the plug sockets 220, 230 and 240 by a plug. After making the electric connection, the cover plate 272 is closed to conceal the plug of the conductor 34 from the outside. Therefore, the plug of the conductor 34 is protected by the cover plate 272, and maximum safety is ensured. Further, adapters 4 and 40 may be respectively attached to the junction box at two opposite ends for arranging electric wiring longitudinally as well as at the sides thereof.

I claim:

1. A junction box comprising:

a generally rectangular casing including opposite sides having holes formed therethrough for receiving electric wires, said casing including an upstanding frame-shaped block at the top thereof, a resilient packing and a frame-shaped flange mounted on said block, said frame-shaped flange having an inner side, a plug socket mounting plate disposed within said casing and including a flat surface portion with two bevel surface portions extending upwardly therefrom and away from one another, said mounting plate also including a pair of dependent substantially parallel flange portions extending downwardly therefrom, said flat surface portion and said bevel surface portions having a plurality of plug sockets mounted thereon for connecting electric plugs into an electric circuit; and a cover plate pivotably connected to said inner side of the frame-shaped flange, said cover plate having a hand-hold portion at one side thereof defining a hole through the cover plate for receiving an electric conductor.

2. A junction box as defined in claim 1 including a frame-shaped top insert mounted between said resilient packing and said frame-shaped flange, so that said frame-shaped flange is adapted to fit substantially flush with a surrounding surface.

* * * * *